United States Patent
Tutino

(10) Patent No.: US 11,414,868 B2
(45) Date of Patent: Aug. 16, 2022

(54) ANGLED THREADED ROD COUPLING HAVING MOUNTABLE PASS THROUGH COUPLER

(71) Applicant: John C. Tutino, Yardley, PA (US)

(72) Inventor: John C. Tutino, Yardley, PA (US)

( * ) Notice: Subject to any disclaimer, the term of this patent is extended or adjusted under 35 U.S.C. 154(b) by 0 days.

(21) Appl. No.: 17/209,529

(22) Filed: Mar. 23, 2021

(65) Prior Publication Data
US 2021/0230875 A1  Jul. 29, 2021

Related U.S. Application Data

(63) Continuation-in-part of application No. 15/930,201, filed on May 12, 2020.

(60) Provisional application No. 62/847,795, filed on May 14, 2019.

(51) Int. Cl.
| | | |
|---|---|---|
| *E04C 5/16* | (2006.01) | |
| *E04B 1/41* | (2006.01) | |
| *E04B 9/20* | (2006.01) | |
| *F16B 37/08* | (2006.01) | |

(Continued)

(52) U.S. Cl.
CPC ............... *E04C 5/165* (2013.01); *E04B 1/40* (2013.01); *E04B 9/20* (2013.01); *E04C 5/167* (2013.01); *F16B 37/08* (2013.01); *F16B 37/0871* (2013.01); *F16B 37/0892* (2013.01); *E04B 2001/1924* (2013.01); *F16L 21/065* (2013.01)

(58) Field of Classification Search
CPC . E04C 5/165; E04C 5/167; E04B 1/40; E04B 9/20; E04B 2001/1924; E04B 9/18; F16B 37/08; F16B 37/0871; F16B 37/0892; F16B 7/185; F16L 21/065
See application file for complete search history.

(56) References Cited

U.S. PATENT DOCUMENTS

| | | | | |
|---|---|---|---|---|
| 2,377,581 A | * | 6/1945 | Shaffrey | F16B 37/0892 |
| | | | | 411/433 |
| 3,006,231 A | * | 10/1961 | Kahn | F16B 5/0291 |
| | | | | 470/23 |

(Continued)

FOREIGN PATENT DOCUMENTS

| | | | | |
|---|---|---|---|---|
| GB | 2469829 A | * | 11/2010 | B25B 29/02 |
| WO | WO-2016138912 A1 | * | 9/2016 | E04C 5/0604 |

*Primary Examiner* — Adriana Figueroa

(57) ABSTRACT

Angled coupling including main pass-through coupler to allow first threaded rod to pass therethrough and second coupling extending at angle therefrom to receive second threaded rod. Angled coupling can be used for multiple purposes including, but not limited to, adjusting location of threaded rod, seismic restraints, storm surge restraints and/or providing additional mounting points for support members. Main coupler is configured to be secured to any location on first threaded rod without requiring it to be screwed onto first threaded rod. Main coupler may include first half and second half each traversing length thereof, that can be secured together at desired location on first threaded rod. Main coupler may include upper section having first approximately half of body thereof and corresponding threads and lower section having second approximately half of body (opposite first half) and corresponding threads. Angled coupling is made of high strength material (e.g., steel, cast iron, composites).

9 Claims, 14 Drawing Sheets

(51) Int. Cl.
*E04B 1/19* (2006.01)
*F16L 21/06* (2006.01)

(56) References Cited

U.S. PATENT DOCUMENTS

| | | | | |
|---|---|---|---|---|
| 4,657,458 | A * | 4/1987 | Wollar | F16B 37/043 411/64 |
| 4,861,081 | A * | 8/1989 | Satoh | E05B 79/12 292/336.3 |
| 5,351,920 | A * | 10/1994 | Decky | F16L 3/13 248/74.1 |
| 5,967,691 | A * | 10/1999 | Lancelot, III | E04C 5/165 403/313 |
| 9,388,575 | B1 * | 7/2016 | Gomez | E04B 9/18 |
| 9,574,598 | B1 * | 2/2017 | Carmichael | F16B 37/0892 |
| 10,018,216 | B1 * | 7/2018 | Espinosa | F16B 37/0814 |
| 10,385,906 | B2 * | 8/2019 | Huang | F16B 37/0821 |
| 10,591,094 | B1 * | 3/2020 | Grimes | F16B 37/0892 |
| 2004/0005188 | A1 * | 1/2004 | Anscher | F16B 37/0885 403/329 |
| 2005/0169701 | A1 * | 8/2005 | Kies | E04C 5/165 403/293 |
| 2020/0025235 | A1 * | 1/2020 | Smith | F16B 37/0821 |

* cited by examiner

ANGLED THREADED ROD COUPLING HAVING MOUNTABLE PASS THROUGH COUPLER

PRIORITY

This application is a continuation in part (CIP) and claims the benefit under 35 USC § 120 of U.S. Utility application Ser. No. 15/930,201 filed on May 12, 2020. application Ser. No. 15/930,201 claimed the benefit under 35 USC § 119 of U.S. Provisional Application 62/847,795 filed on May 14, 2019. application Ser. No. 15/930,201 and 62/847,795 are herein incorporated by reference in their entirety.

BACKGROUND

Threaded rod is commonly used in the construction industry. The threaded rod can be used, for example, to support various items. The threaded rod is typically mounted to a ceiling and/or floor and then connected to some type of support member (e.g., rail, bracket). The support member is to, for example, provide support, hold and/or secure to an object (e.g., plumbing, HVAC). The threaded rod may be secured to the floor and/or ceiling by threading it into a support (anchor bolt, insert) that is mounted to the floor/ceiling, where the support includes an internally threaded receiving portion. The threaded rod may be secured to a connection point on the support member with, for example, one or more threaded through bolts. Basically, the threaded rod is for the purpose of fastening anything to the floor/ceiling using the mounted support and a through bolt. The floor/ceiling mounted support should be aligned with the connection point on the support member so that the threaded rod runs in a substantially straight line therebetween.

FIG. 1A illustrates an example threaded rod 100 connecting a mounted support 110 in a ceiling 115 and a connection point 120 in a support member 125 used to support, for example, a pipe 130. As illustrated, the threaded rod 100 is threaded into the mounted support 110 and is secured to the connection point 120 using one or more bolts 140 (a top and bottom bolt illustrated).

The mounted support 110 and the connection point 120 are not always aligned for various reasons. Rather, the mounted support 110 and the connection point 120 may be spaced apart in one or more directions. In these cases, the threaded rod 100 is not able to run in a straight line between the mounted support 110 and the connection point 120. Rather, the threaded rod 100 extending from the mounted support 110 may need to be bent (e.g., two times) in order to be able to connect to the support member 125.

FIG. 1B illustrates an example threaded rod 100 having to connect a misaligned mounted support 110 and connection point 120. As such, the threaded rod 100 cannot run therebetween in a straight line. Rather, the threaded rod 100 must be square with both the mounted support 110 and the connection point 120 and be bent therebetween in order to provide the connection to both. As illustrated, the threaded rod 100 includes a first portion 150 that extends substantially perpendicular to the ceiling 115. The rod 100 is then bent at a first angle 155 in a direction toward the connection point 120. A second portion 160 of the rod 100 then traverses downward at the angle 155 until it substantially reaches location of the connection point 120. At this point the rod 100 is bent at a second angle 165 in a direction toward the connection point 120. A third portion 170 of the rod 100 traverses downward substantially perpendicular to the ceiling 115 and parallel to the first portion 150 and is secured to the connection point 120 with the bolt(s) 140.

Each angle 155, 165 may be 45 degrees and the length of the second portion 160 may be approximately 1.41 times the distance that the rod is moved horizontally 180 (distance between first portion 150 and the third portion 170).

In order to bend the threaded rod 100 as illustrated in FIG. 1B, the rod likely needs to be heated to the point where it becomes flexible and can be bent into place. The larger the diameter of the threaded rod the more difficult it is to bend. The heating and bending of the threaded rod is time consuming. Furthermore, it takes a certain amount of skill to make sure the angles and distances are correct to get the threaded rod shaped so that it can be used. Moreover, the heating and bending of the threaded rod may compromise the integrity of the threaded rod.

In some instances, the support member may be supported by more than a single point. For example, in areas suspectable to earthquakes or in locations that may be susceptible to vibrations or movement, the support member may be supported from various directions to provide seismic restraint to the support member and the object being supported.

FIG. 2 illustrates the use of a seismic restraint system 200 providing support to the support member 125 supporting the object 130 (e.g., pipe). The system 200 includes a main bracket (e.g., U channel) 210 and a swivel bracket 220, 230 on each side thereof. A first swivel bracket 220 would be connected to the ceiling (not labeled) and a second swivel bracket 230 is connected to the support member 125. The seismic restraint system 200 is connected to a different portion of the support member 125 than the main support (threaded rod 100). The threaded rod 100 is square with the support member 125 and holds the support bracket 125 from above while the seismic restraint system 200 provides support from the side.

Storm pipes may have a surge flowing therethrough and in order to ensure the various pipes do not come apart during these surges, the storm pipes typically use restraints to secure the different pipes together.

FIG. 3 illustrates a storm-pipe restraint system 300 used for securing storm pipes together. The illustrated system 300 is for two separate storm pipes that merge together at an angle (using an angled pipe). The system includes a plurality of brackets 310, a plurality of clamps 320 and a plurality of arms 330. The brackets 310 are used to wrap around the pipes and the clamps 320 are used to tighten the brackets to the pipe. The arms 330 are connected between the different clamps 310 in order to help secure the pipes together.

What is needed, is an easier and more convenient way to adjust the threaded rod so that it can be used in situations where the mounted support and the connection point are not aligned or where multiple pieces of threaded rod need to be connected in some fashion. What is needed is an angled coupling that can receive multiple pieces of threaded rod in order to adjust the location of the threaded rod without the need to heat and bend the rod as discussed above. Furthermore, such an angled coupling could be used for seismic restraints and/or storm surge restraints.

BRIEF DESCRIPTION OF DRAWINGS

The features and advantages of the various embodiments will become apparent from the following detailed description in which.

DETAILED DESCRIPTION

Figure 4A:
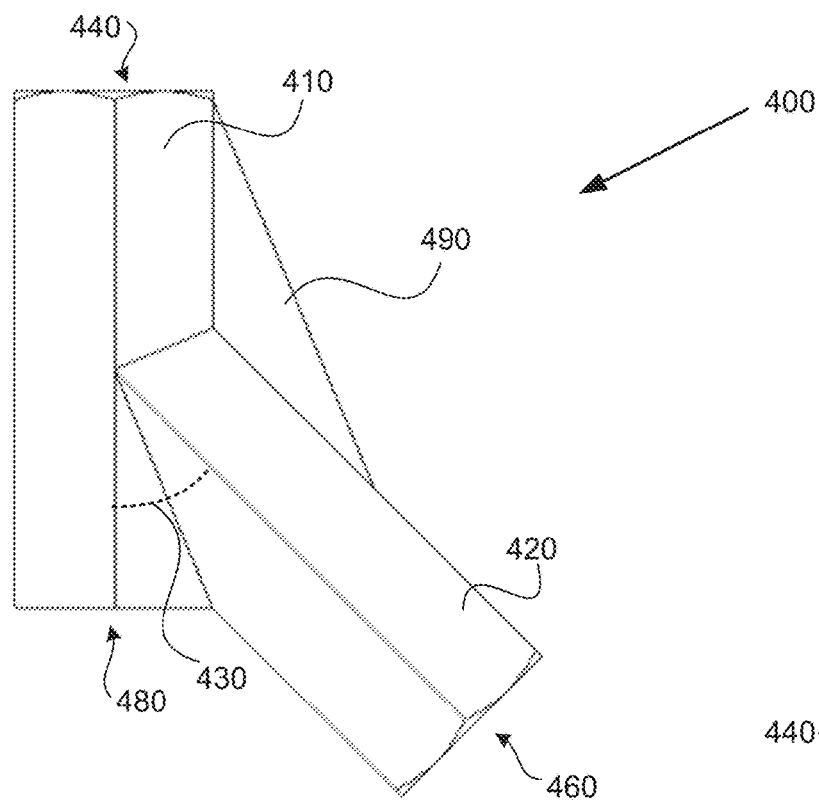
FIGS. 4A-C illustrate several views of an example angled coupling that could be used to angle the threaded rod rather than bending the rod, according to one embodiment.
Figure 4B:
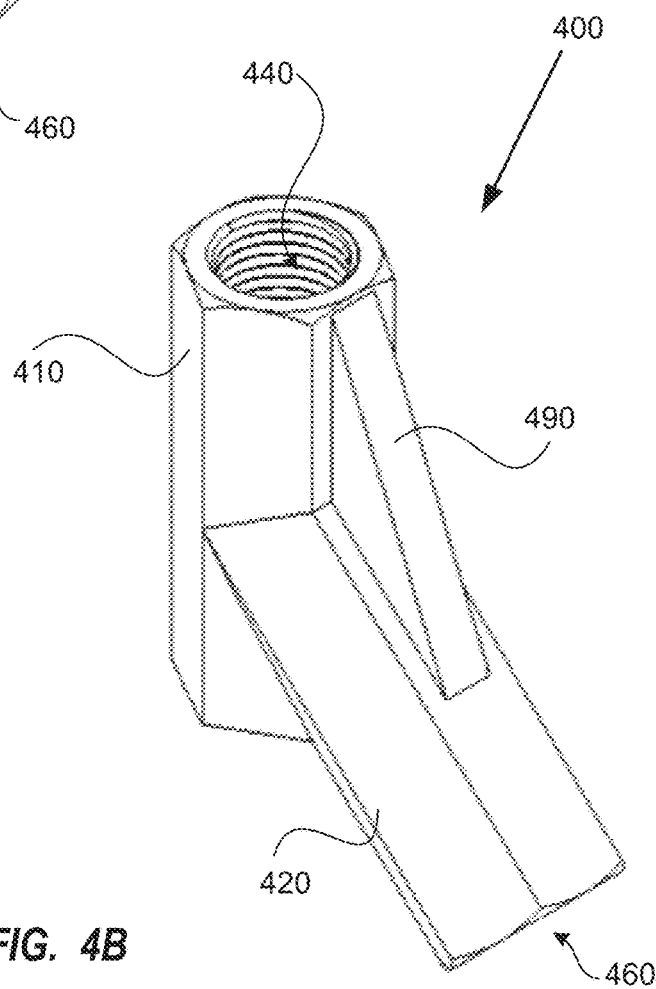
Figure 4C:
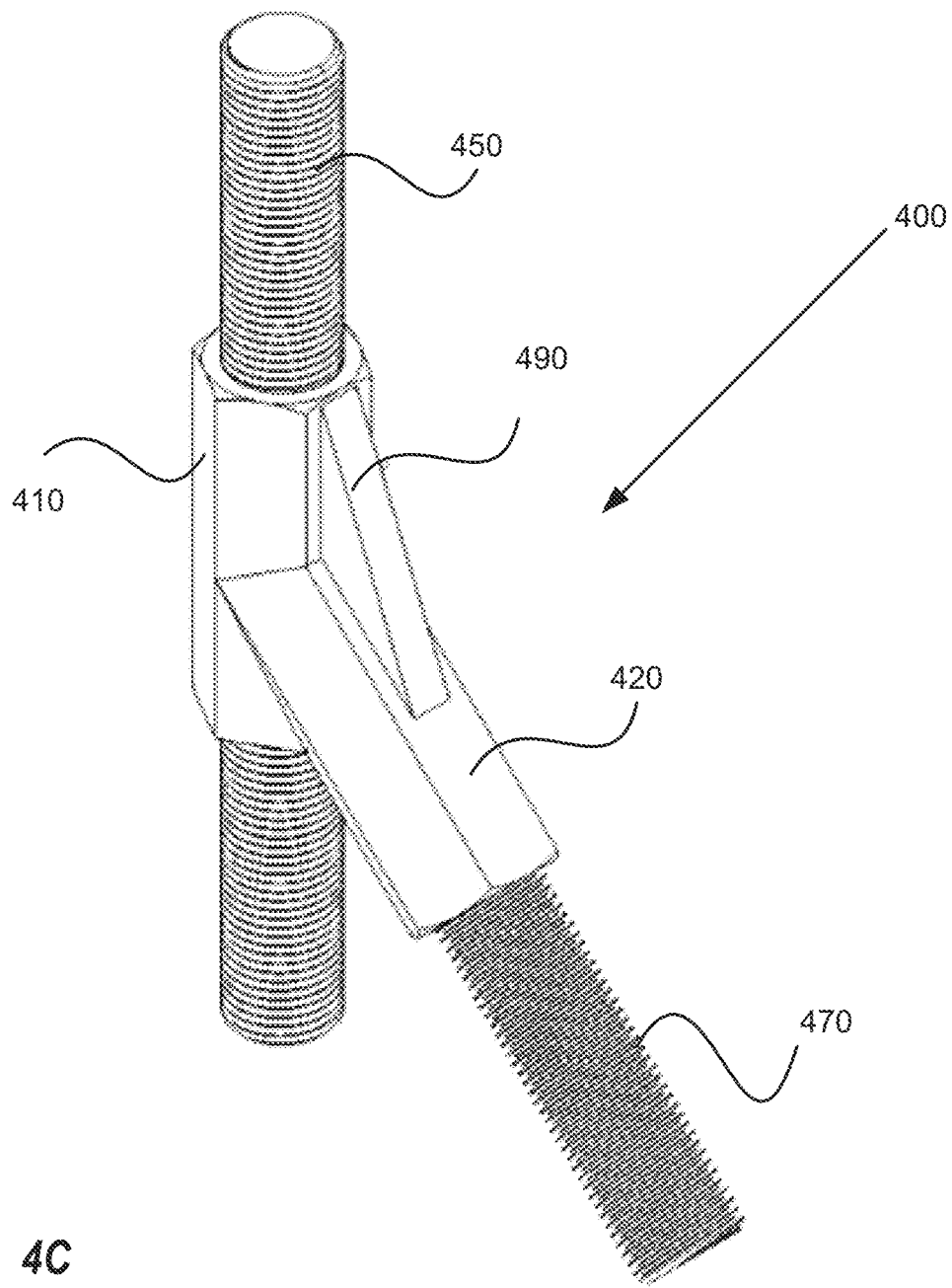

FIGS. 4A-C illustrate several views of an example angled coupling 400 that could be used to angle the threaded rod rather than bending the rod. The angled coupling 400 includes a first (main) internally threaded receptacle (coupler) 410 and a second internally threaded receptacle (coupler) 420 that is rotated at a 45-degree angle 430 from the first coupler 410. The angle 430 is not limited to 45 degrees, but rather could be other standard angles that may be used in the field (e.g., 30 degrees, 60 degrees). The first coupler 410 may have an opening 440 for receiving a first threaded rod 450. The second coupler 420 may have an opening 460 for receiving a second threaded rod 470 that extends at the 45-degree angle 430 from the first threaded rod 450.

According to one embodiment, the first coupler 410 may include a second opening 480 at an opposite end thereof. The first coupler 410 may be a passthrough coupler where an interior is open from the first opening 440 to the second opening 480. The first coupler 410 may enable the first threaded rod 450 to pass therethrough or may receive a different threaded rod from each side thereof.

According to one embodiment, the second end of the first coupler 410 may be closed so that the first threaded rod 450 is simply secured therewithin. According to one embodiment, in order to provide additional support, a support bracket 490 may be utilized between the two couplers 410, 420.

The size of the openings and the threading (as visible in FIG. 4B) within the couplers 410, 420 of the angled coupling 400 may be based on the type of threaded rod 450, 470 that it is being used. According to one embodiment, the diameter of the openings 440, 460 (and possibly 480) and the threading within each coupler 410, 420 may be the same. However, the invention is in no way limited thereto. Rather, the diameter of the openings 440, 460 (and possibly 480) and/or threading for each of the couplers 410, 420 may be different based on the desired configuration in the field. For example, it may be desired for the second threaded rod 470 to have a larger diameter than the first threaded rod 450.

According to one embodiment, at least one of the couplers 410, 420 may include a plurality of opening diameters so that it can be used with various sized threaded rod. The largest opening may be located closest to the exterior and the smallest may be located furthest from the opening. Larger threaded rod could secure to the threads of the outer opening diameter while smaller threaded rod could pass through the outer opening diameter and be secured to the threads of the inner opening diameter. According to one embodiment, one or more inserts could be utilized to enable the angled coupling 400 to be utilized with threaded rod that is a smaller size than the couplers 410, 420. The various diameter/thread sizes provided by the coupler or the inserts may enable a standard angled coupling 400 to be used in different situations rather than needing different angled couplings for different situations.

According to one embodiment, the angled coupling 400 is made from a high strength material. The materials utilized may include for example, steel, cast iron, composites, high strength plastics, or combinations thereof. According to one embodiment, if the coupling 400 was used in a storm-pipe restraint system it may be made of stainless steel (or other materials with the desired strength and anti-rusting properties) to prevent rusting.

According to one embodiment, the angled coupling 400 may be manufactured with the desired angle 430. Various methods in which the angled coupling 400 may be manufactured (e.g., machined, extruded) are within the current scope. According to one embodiment, the angled coupling 400 may be formed by, for example, welding two straight couplers together (e.g., couplers 410, 420). In order to weld the straight couplers together an end of one or both of the couplers may be cut at a certain angle so that when they are put together the angled coupling 400 has the desired angle 430.

According to one embodiment, the angled coupling 400 may be manufactured with the support bracket 490. According to one embodiment, the support bracket 490 may be manufactured separate and may be added to the angled coupling 400 by, for example, welding.

Figure 1A:
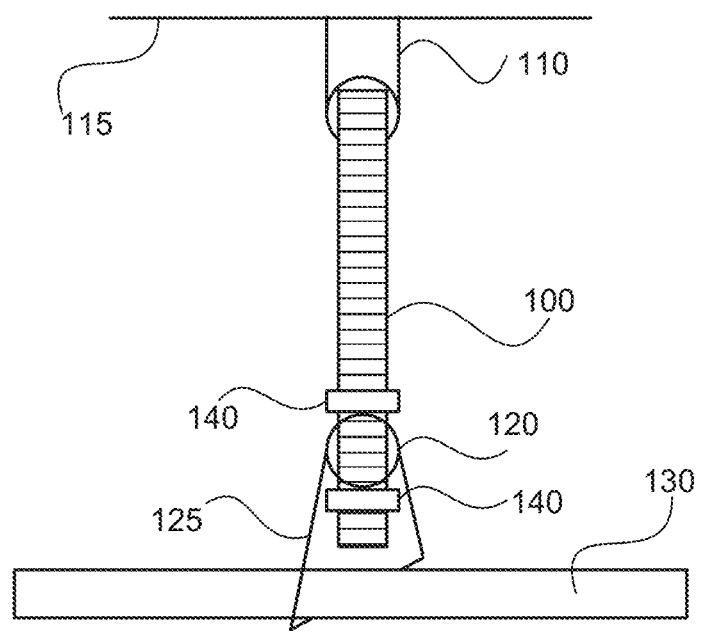
FIG. 1A illustrates an example threaded rod connecting a mounted support in a ceiling and a connection point in a support member used to support, for example, a pipe.
Figure 1B:
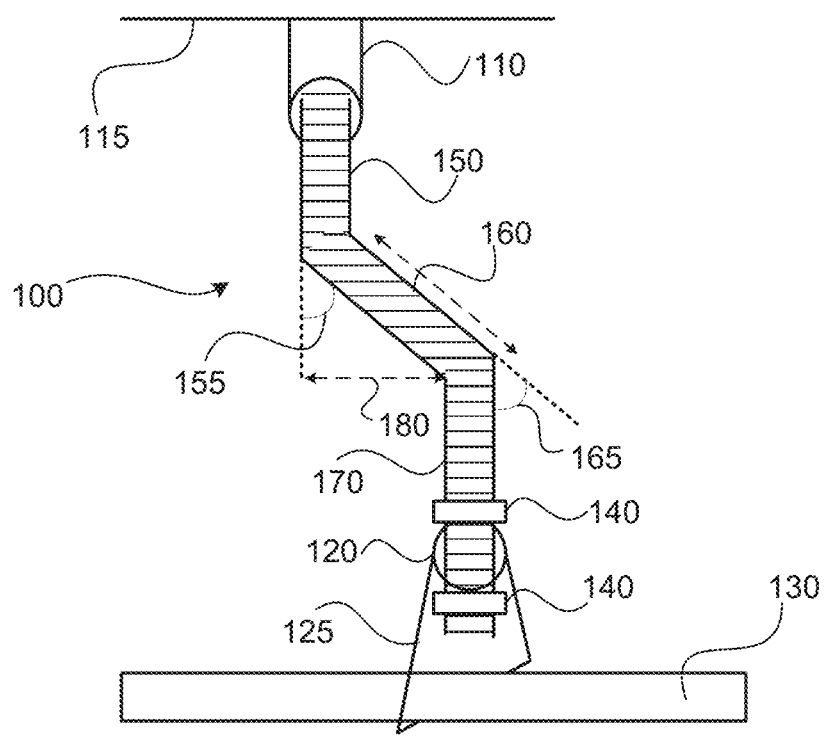
FIG. 1B illustrates an example threaded rod having to connect a misaligned mounted support and connection point.
Figure 2:
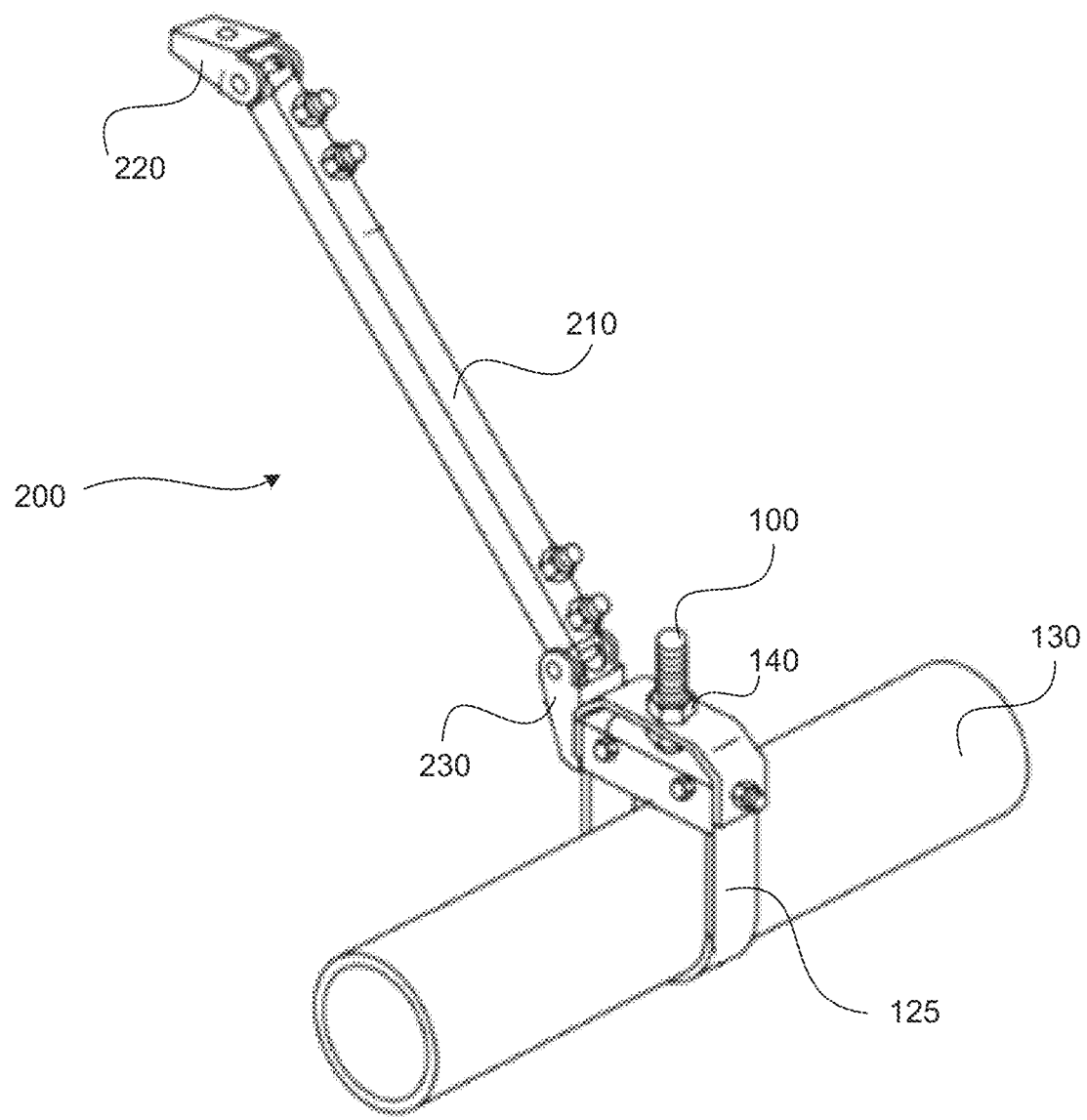
FIG. 2 illustrates the use of a seismic restraint system providing support to the support member supporting the object (e.g., pipe).
Figure 3:
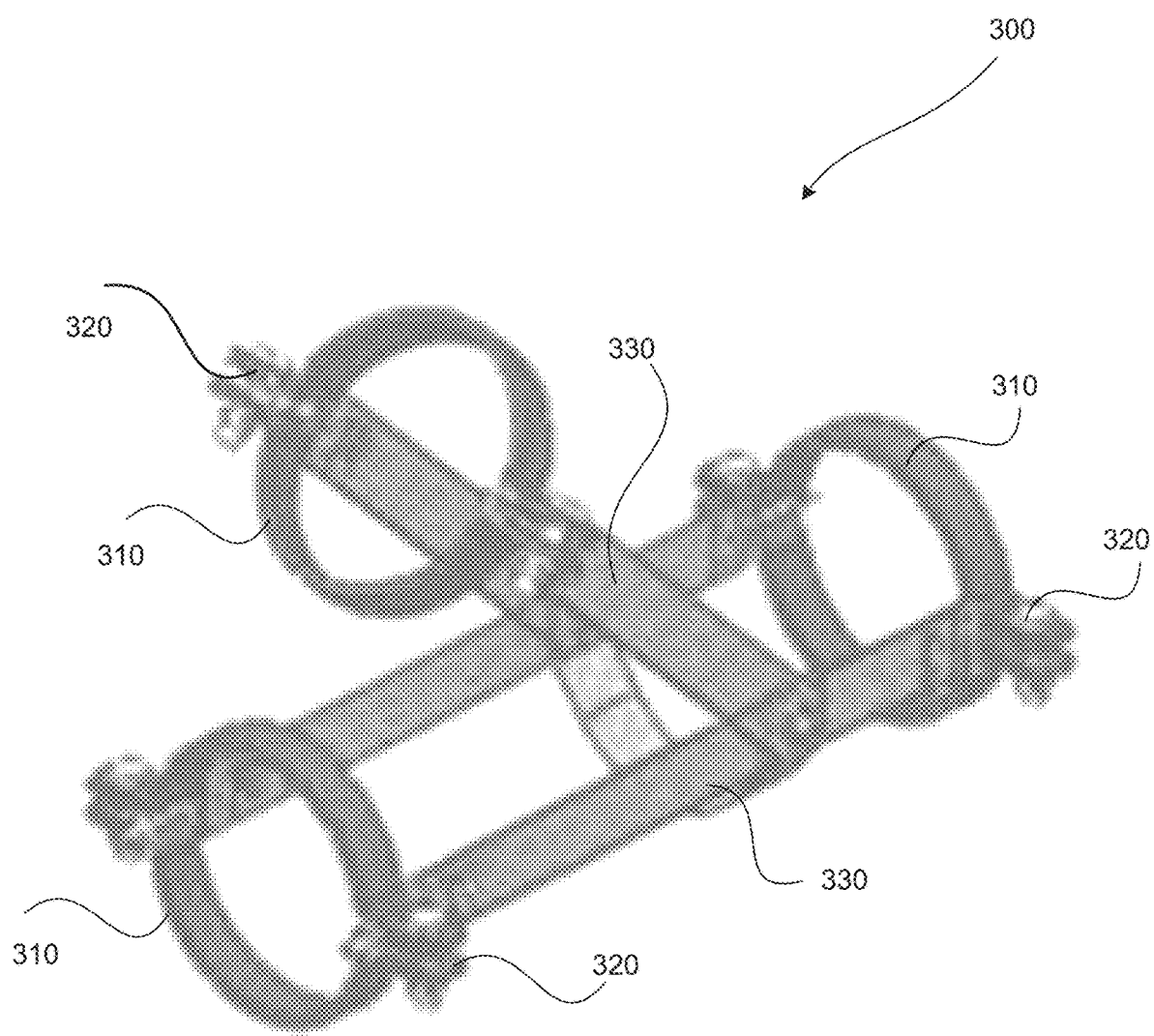
FIG. 3 illustrates a storm-pipe restraint system used for securing storm pipes together.
Figure 5A:
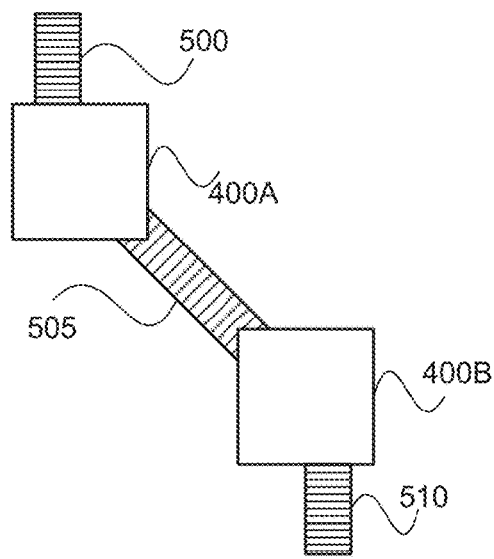
FIGS. 5A-F illustrate several views of the example angled couplings of FIGS. 4A-C utilized in practical applications, according to different embodiments.

FIGS. 5A-F illustrate several views of the example angled coupling 400 utilized in practical applications. It should be noted that for ease of illustration the angled coupling 400 is simply illustrated as a box in several of the figures. FIG. 5A illustrates two angled couplings 400A, 400B utilized to shift the threaded rod a certain distance (to the right as illustrated). This type of implementation may be utilized when, for example, a mounted support (not illustrated) in a ceiling (not illustrated) is not aligned with a connection point (not illustrated) in a support member (not illustrated). This type of implementation may be utilized instead of bending the threaded rod as illustrated in FIG. 1B. A first threaded rod 500 extends from the mounted support to a first angled coupling 400A that receives the first threaded rod 500 square. A second threaded rod 505 extends from the first angled coupling 400A at a fixed angle (preferably 45 degrees but not limited thereto). The second threaded rod 505 is received at a fixed angle (e.g., 45 degrees) by a second angled coupling 400B. A third threaded rod 510 extends downward from the second angled coupling 400B to, for example, be secured to the connection point in the support member. It should be noted that the second angled coupling 400B is utilized in opposite manner of the first angled coupling 400A (e.g., it has been rotated around both horizontal and vertical axes so that it receives second threaded rod 505 at upper left as opposed to lower right, and the third threaded rod 510 extends from bottom as opposed to top).

Figure 5B:
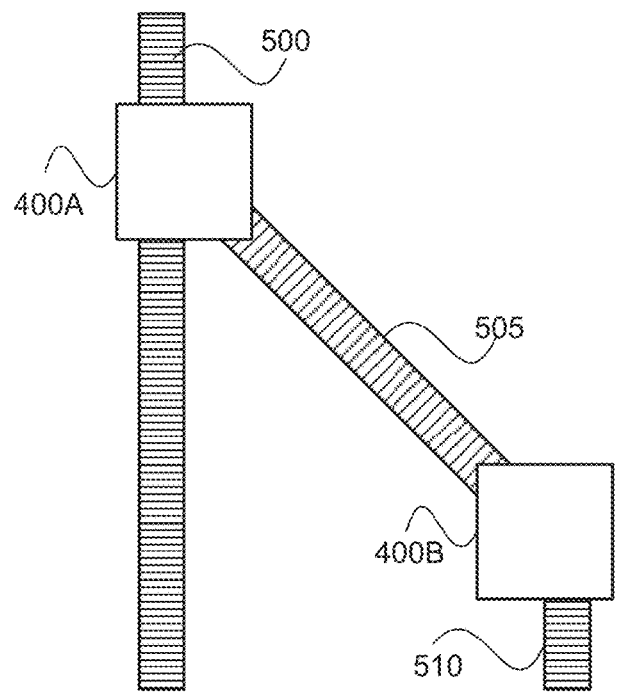

FIG. 5B illustrates the same two angled couplings 400A, 400B being utilized to provide another threaded rod 510 a certain distance away from the threaded rod 500 secured to mounted support in the ceiling (to the right as illustrated).

This type of implementation may be utilized when, for example, a mounted support may not be practical or possible to mount in the ceiling above an additional connection point in a support member. In this embodiment, the first threaded rod 500 passes through the first angled coupling 400A so that it can be secured to a first connection point (not illustrated) on the support member (not illustrated) and the third threaded rod 510 can be secured to a second connection point (not illustrated) on the support member (not illustrated). It should be noted that the third threaded rod 510 could be used to secure to other support members rather than the same support member.

Figure 5C:
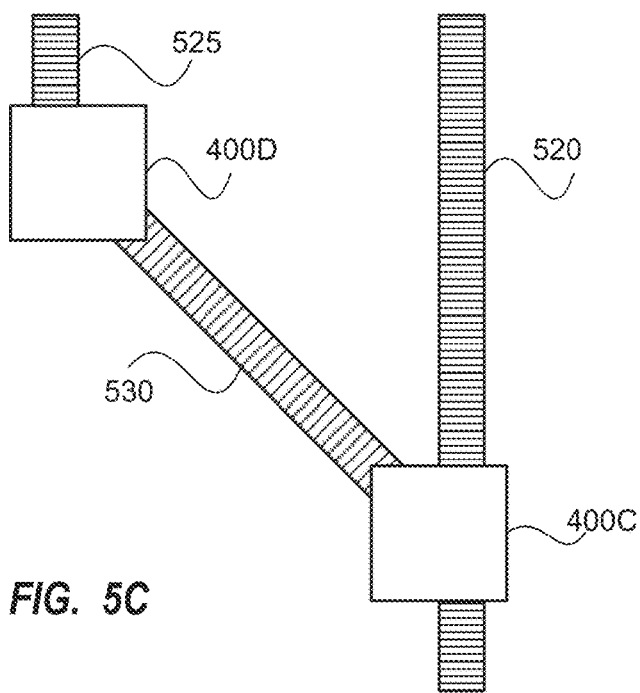

FIG. 5C illustrates two angled couplings 400C, 400D being utilized to provide a seismic restraint system to reduce or eliminate sway in a support member or the object (e.g., pipe) being supported therein. This type of implementation may be utilized, for example, in areas suspectable to earthquakes or in locations that may be susceptible to vibrations or movement. A first threaded rod 520 extends downward from a first mounted support (not illustrated) in a ceiling (not illustrated) in order to secure to a connection point (not illustrated) in a support member (not illustrated) as would typically be the case. However, the first threaded rod 520 passes through a first angled coupling 400C. A second threaded rod 525 extends downward from a second mounted support (not illustrated) in the ceiling a certain distance away from the first mounted support (to the left as illustrated). The second rod 525 is received by a second angled coupling 400D. A third threaded rod 530 extends from the second angled coupling 400D at a fixed angle (preferably 45 degrees but not limited thereto). The third threaded rod 530 is received at a fixed angle (e.g., 45 degrees) by the first angled coupling 400C. The third threaded rod 530 provides the sway support for the support member. It should be noted that the second angled coupling 400D is utilized in opposite manner of the first angled coupling 400C.

Figure 5D:
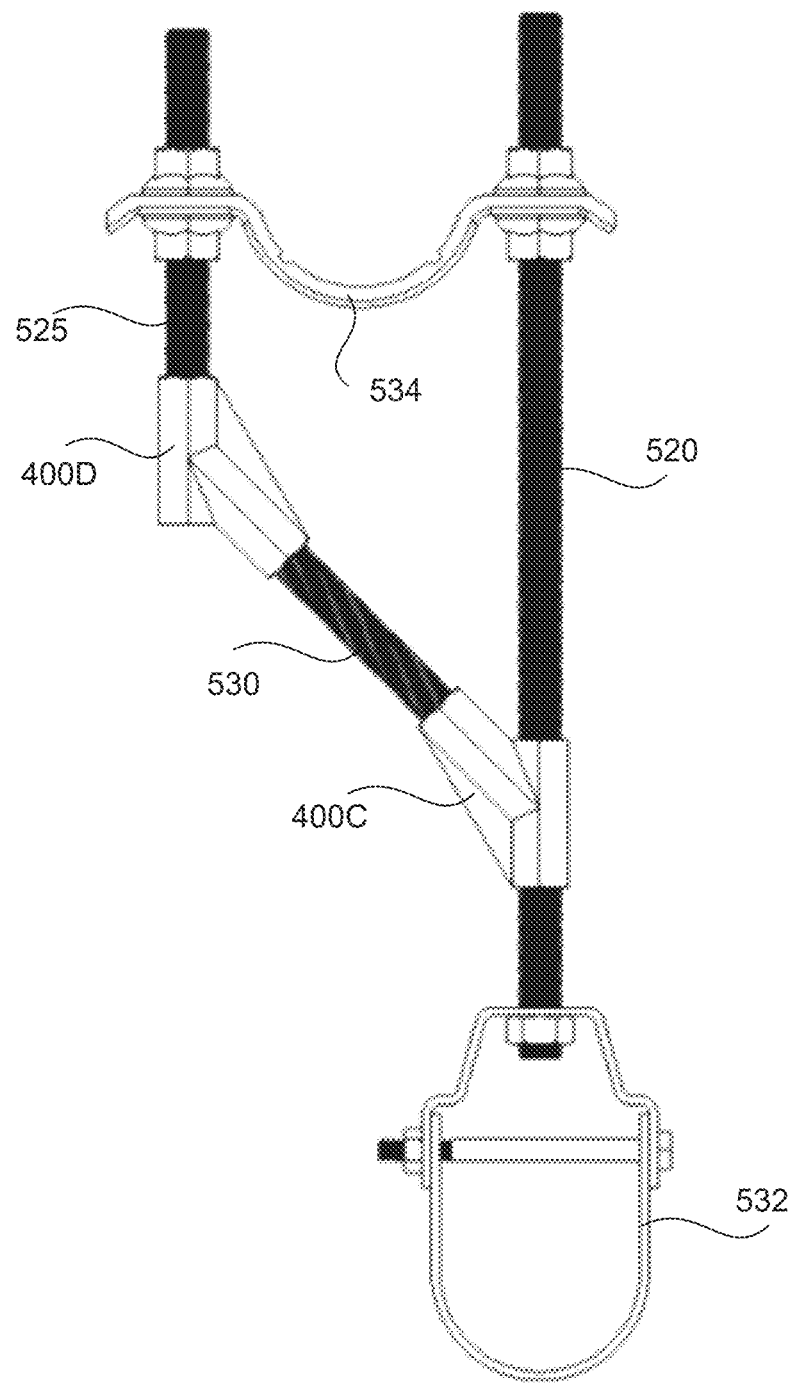

FIG. 5D illustrates a detailed view of the two angled couplings 400C, 400D being utilized. The first threaded rod 520 passes through the first coupler (not labeled) of the first angled coupling 400C and is secured to a first support member (e.g., clevis hanger) 532 with a nut (not labeled). The second threaded rod 525 is received by the first coupler (not labeled) of the second angled coupling 400D. The third threaded rod 530 extends from the second coupler (not labeled) of the second angled coupling 400D and is received by the second coupler (not labeled) of the first angled coupling 400C. As illustrated, a second support member (e.g., riser clamp) 534 is located between the first and second threaded rods 520, 525. The second support member 534 may be utilized to support a pipe. A pipe located on the second support member 534 may be secured thereto in some fashion.

According to one embodiment, the first and the second threaded rod 520, 525 extend downward from the mounted supports (not illustrated) in the ceiling (not illustrated) and this configuration is utilized to provide a seismic restraint system (sway support) for the first support member 532. According to one embodiment, the first threaded rod 520 extends downward from the mounted supports (not illustrated) in the ceiling (not illustrated) and the third and second threaded rods 530, 525 extend upwards therefrom with the use of the couplings 400C, 400D to provide a second mounting point for the second support member 534.

Figure 5E:
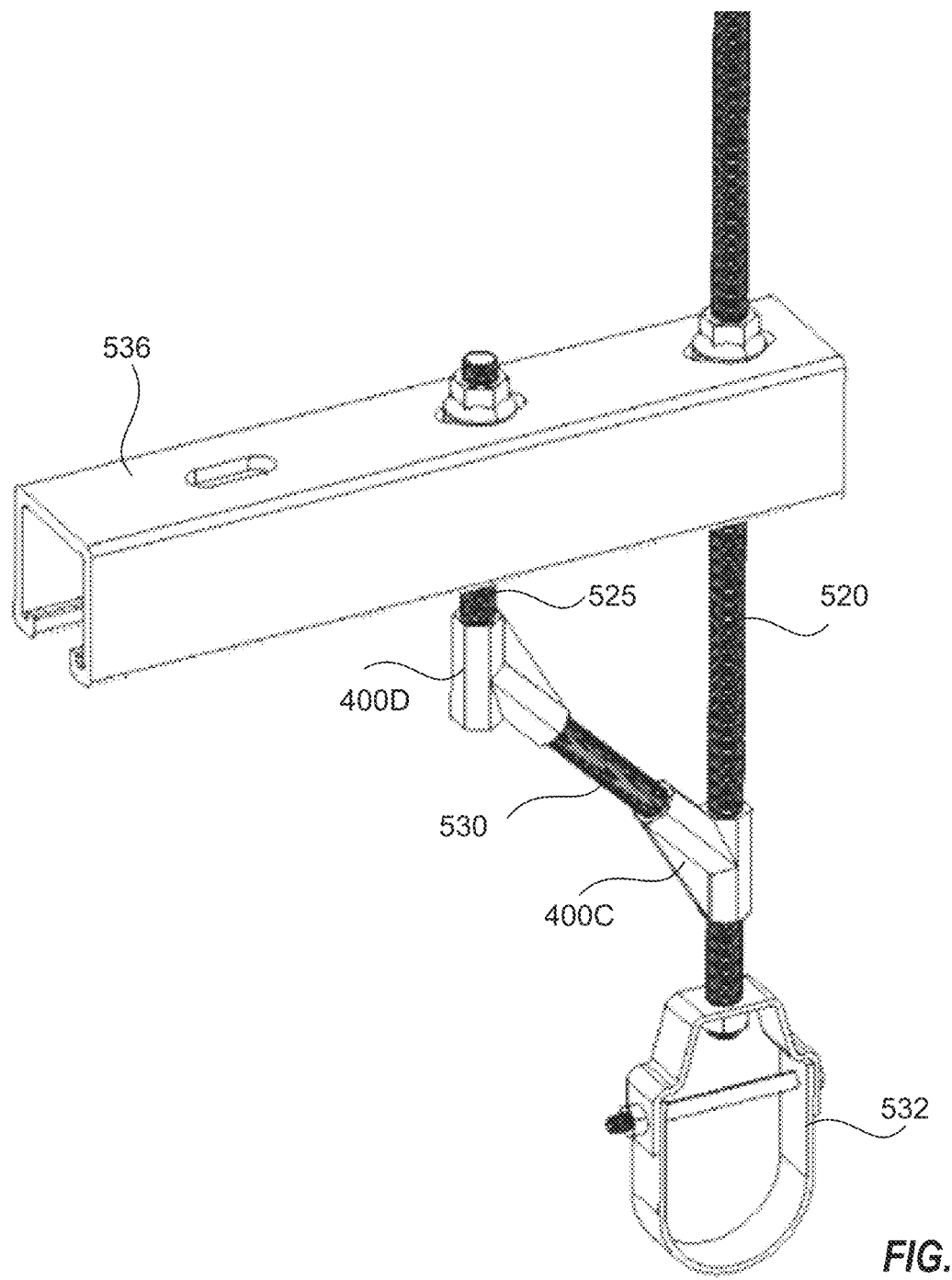

FIG. 5E illustrates a more detailed view of the two angled couplings 400C, 400D being utilized. The first threaded rod 520 extends downward from the mounted supports (not illustrated) in the ceiling (not illustrated). The first threaded rod 520 passes through the first coupler (not labeled) of the first angled coupling 400C and is secured to a first support member (e.g., clevis hanger) 532 with a nut (not labeled). A second support member (e.g., C-channel strut) 536 extends from the first threaded rod 520. The second threaded rod 525 is secured to the second support member 536 and traverses downward therefrom where it is received by the first coupler (not labeled) of the second angled coupling 400D. The third threaded rod 530 extends from the second coupler (not labeled) of the second angled coupling 400D and is received by the second coupler (not labeled) of the first angled coupling 400C.

According to one embodiment, the use of the second support member 534 enables the second threaded rod 525 to be secured thereto as opposed to being secured to a mount in the ceiling in order top provide a seismic restraint system (sway support) for the first support member 532. According to one embodiment, the third and second threaded rods 530, 525 extending upwards from the first rod 520 provide a second mounting point for the second support member 536. The second support member 536 may be utilized to support a pipe or other objects. A pipe located on the second support member 536 may be secured thereto in some fashion.

Figure 5F:
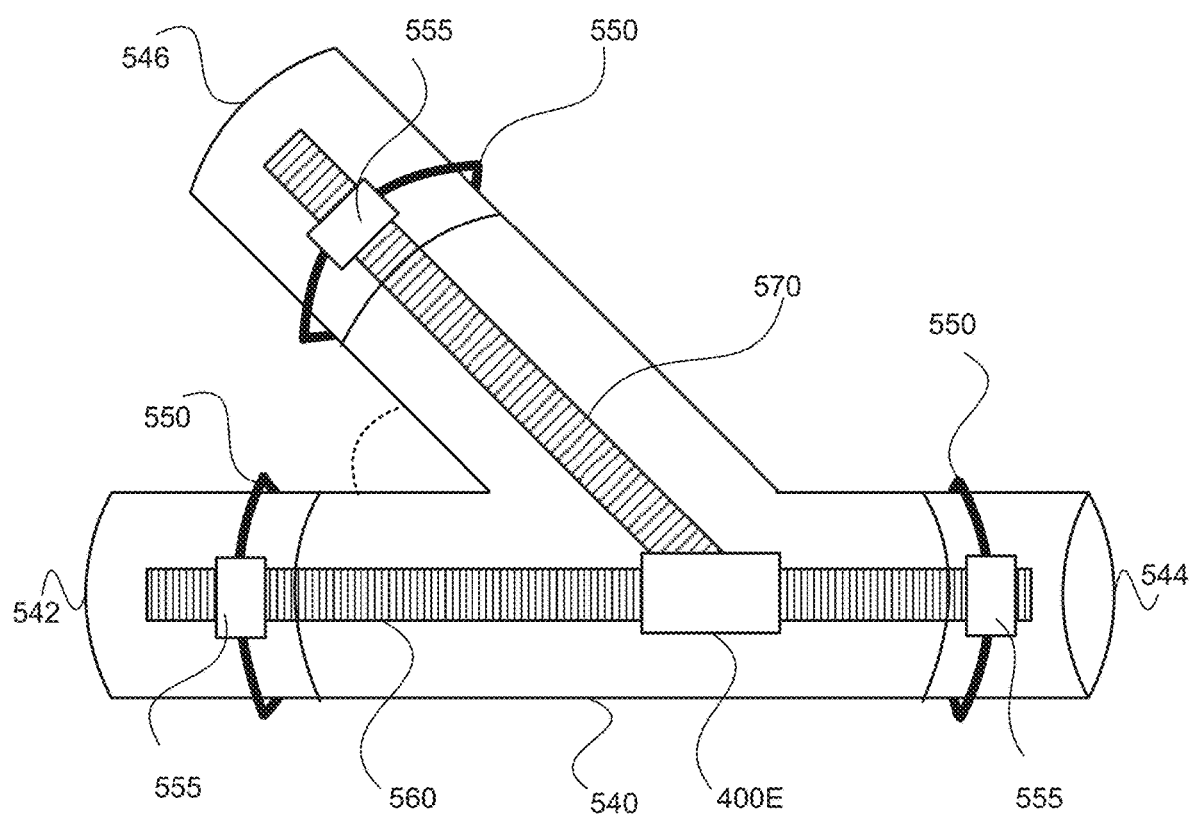

FIG. 5F illustrates an angled coupling 400E being utilized as part of a storm-pipe restraint system to ensure storm pipes do not come apart when a surge flows therethrough. As illustrated, a storm pipe system includes a main storm pipe traversing horizontally and a second storm pipe merging with the first storm pipe via an angled pipe (e.g., 45 degrees) 540. The main storm pipe includes pipes 542, 544 connecting to horizontal ends of the angled pipe 540. The second storm pipe includes a pipe 546 connecting to the angled end of the angled pipe 540. The storm-pipe restraint system is to hold the angled pipe 540 to the other pipes 542, 544, 546 connecting thereto.

The storm-pipe restraint system includes a plurality of brackets 550, a plurality of clamps 555, a plurality of threaded rods 560, 570 and the angled coupling 400E. The brackets 550 are used to wrap around the pipes 542, 544, 546 and the clamps 555 are used to tighten the brackets 550 to the pipes 542, 544, 546 as well as secure the threaded rods 560, 570. The angled coupling 400E is used to secure the threaded rods 560, 570 together. The first threaded rod 560 passes through the angled coupling 400E and the second threaded rod 570 is received at the defined angle (e.g., 45 degrees). The threaded rods 560, 570, the brackets 550, the clamps 555 and the angled coupling 400E help secure the pipes 540, 542, 544, 546 together.

The embodiments of the angled coupling 400 illustrated in FIGS. 4A-C require the couplers 410, 420 to be either screwed onto the threaded rod 450, 470 or to have the threaded rod 450, 470 be screwed thereinto. If the rod 450 is to pass through the coupler 410 (in opening 440 and out opening 480) as illustrated in FIG. 4C the angled coupling 400 will have to be screwed onto the rod 450. Likewise, for the practical application illustrated in FIG. 5B, the coupling 400A would have to be screwed onto the threaded rod 500 and for the practical applications illustrated in FIGS. 5C-5E the angled coupling 400C would have to be screwed onto the threaded rod 520. Depending on how far from an end of the rod the coupling is to be located (where the second coupler 420 is needed) the coupling may need to be rotated around the rod many times. This may be time consuming process that is possibly not practical in some situations.

Figures 6A, 6B:
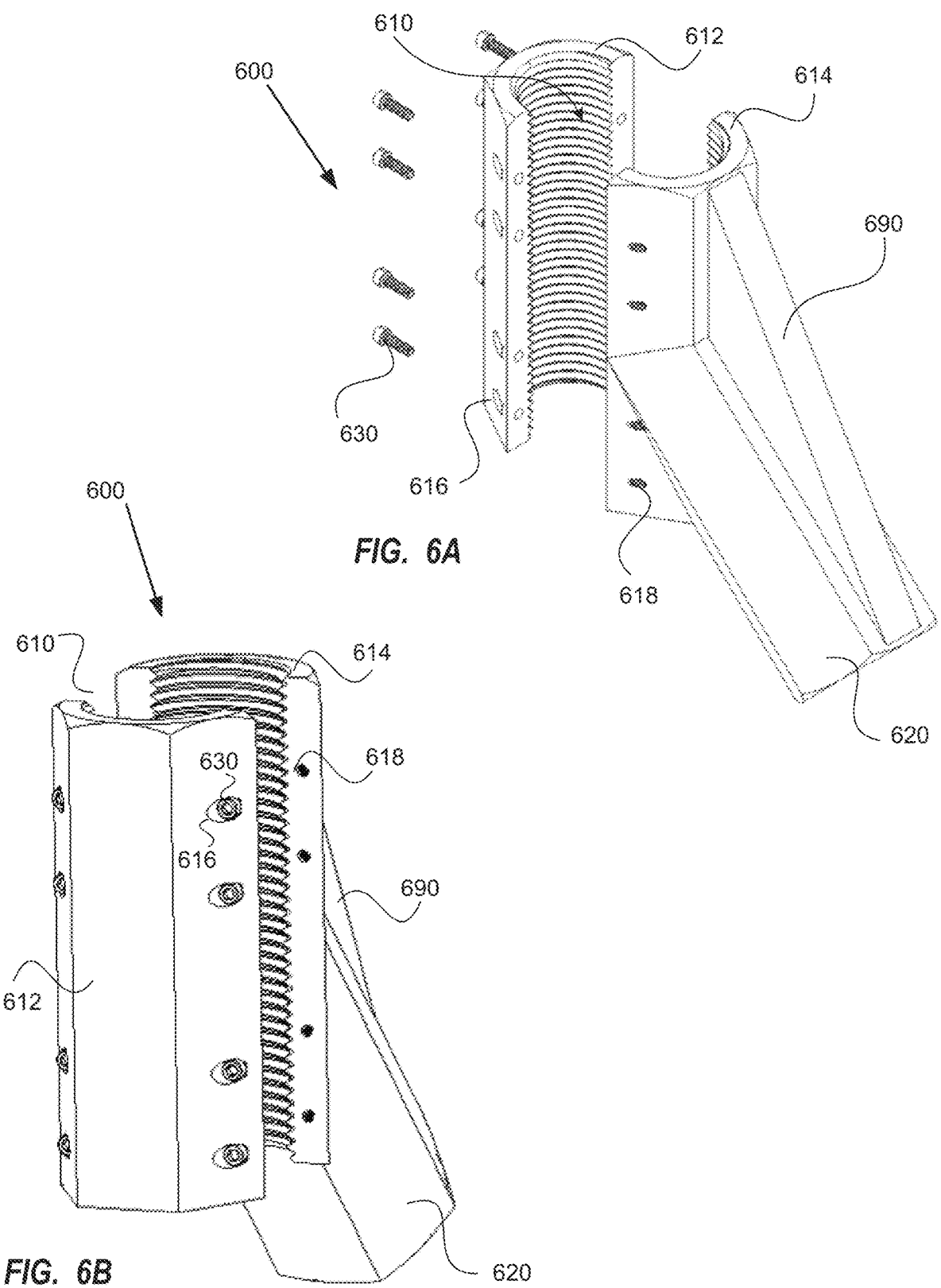
FIGS. 6A-C illustrate several views of an example split angled coupling, according to one embodiment.
Figure 6C:
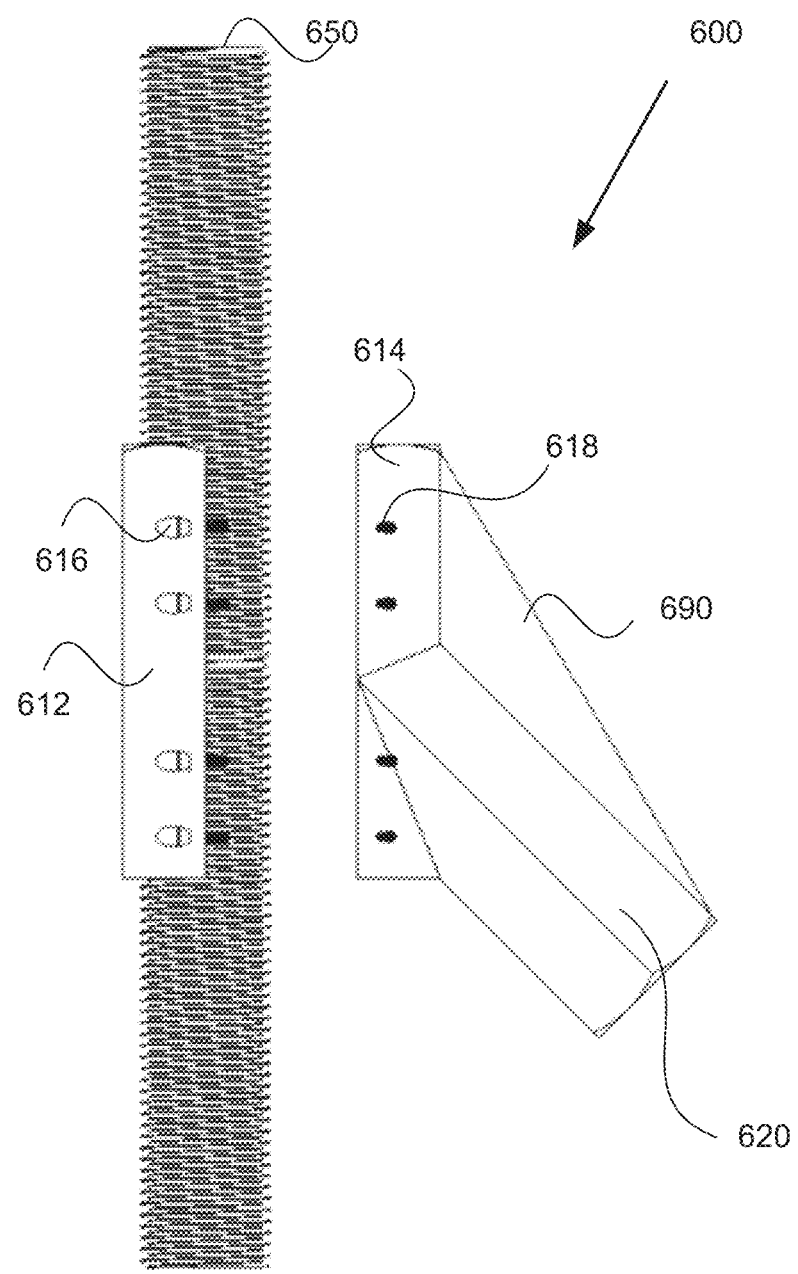

FIGS. 6A-C illustrate several views of an example split angled coupling 600 that could be secured to any location on a threaded rod without requiring it to screwed thereonto. The angled coupling 600 is similar to the angled coupling 400 in that it includes a first (main) internally threaded receptacle (coupler) 610 and a second internally threaded receptacle (coupler) 620 that is rotated at an angle (e.g., 45-degrees) from the first coupler 610. The first coupler 610 has a first opening (not labeled) on one side to receive a threaded rod 650. The first coupler 610 may include a second opening (not labeled) on an opposite side so that the threaded rod 650 can pass through the first coupler 610 (as illustrated in FIG. 6C) or a second threaded rod (not illustrated) can be received in the second opening. The second coupler 620 may have an opening (not labeled) for receiving a second threaded rod (not illustrated) that extends at the angle from the first threaded rod 650.

The first coupler 610 is split into a first half 612 and a second half 614 where the second half 614 and the second coupler 620 are located together. The first half 612 and the second half 614 may have aligned holes 616, 618 for securing the halves 612, 614 together with, for example, screws 630. The holes 616 may be recessed so as to receive heads of the screws 630 therein. The holes 618 may be threaded in order to hold the screws 630 therein and to secure the halves 612, 614 together.

The threads (not labeled) within the first coupler are clearly visible in FIGS. 6A-B. As illustrated, the threads and the opening diameter are the same all the way through the first coupler 610 but are not limited thereto.

According to one embodiment, in order to provide additional support, a support bracket 690 may be utilized between the second half 614 of the first coupler 610 and the second coupler 620.

The split angled coupling 600 illustrated in FIGS. 6A-C, would enable the first and second halves 612, 614 to be placed on any portion of the threaded rod 650 and then be secured together with the screws 630. The threads within the first coupler 610 provide additional support. The split embodiment enables the coupling 600 to be located anywhere on the threaded rod 650 without requiring the coupling to be rotated therearound a large number of times. Furthermore, if an item (e.g., support member, strut, bracket, connector, nut) was located on the threaded rod 650 prior to the point where the coupling 600 was to be located, you would not need to remove the item in order to utilize the coupling 600.

FIGS. 7A-G illustrate several views of an example twist-on angled coupling 700 that could be secured to any location on a threaded rod without requiring it to be screwed thereonto. The angled coupling 700 is similar to the angled coupling 400 in that it includes a first (main) internally threaded receptacle (coupler) 710 and a second internally threaded receptacle (coupler) 720 that is rotated at an angle (e.g., 45-degrees) from the first coupler 710. The first coupler 710 has an upper portion 712 that is approximately a first half (back half as illustrated) of the body of the coupler 710, a middle portion 714 that is only located along the side shared with the second coupler 720 and a lower portion 716 that is approximately a second half (front half as illustrated) of the body of the coupler 710 opposite the first half. According to one embodiment, in order to provide additional support, a support bracket 790 may be utilized between the upper portion 712 of the first coupler 710 and the second coupler 620.

Figure 7A:
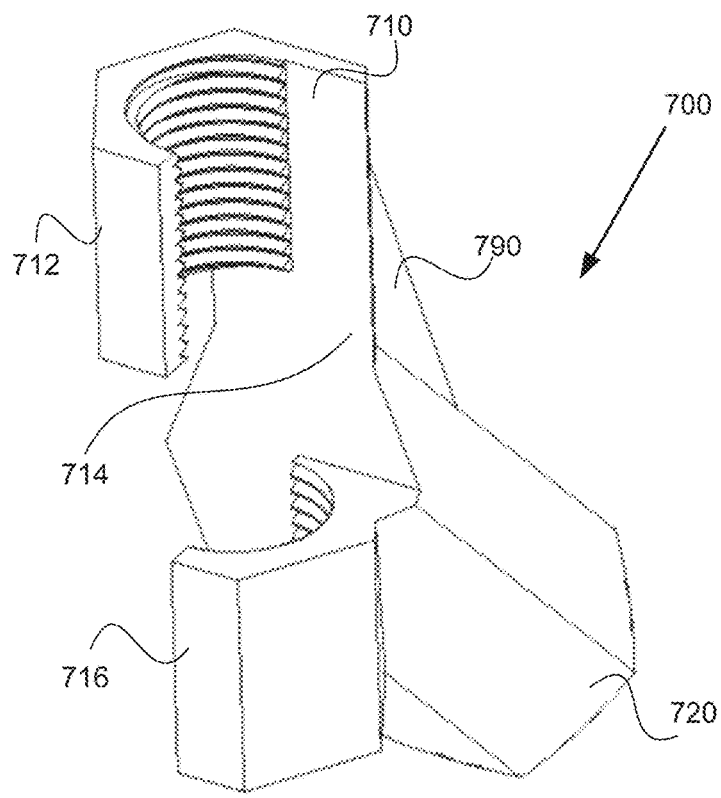
FIGS. 7A-D illustrate several views of an example twist-on angled coupling, according to one embodiment.
Figure 7B:
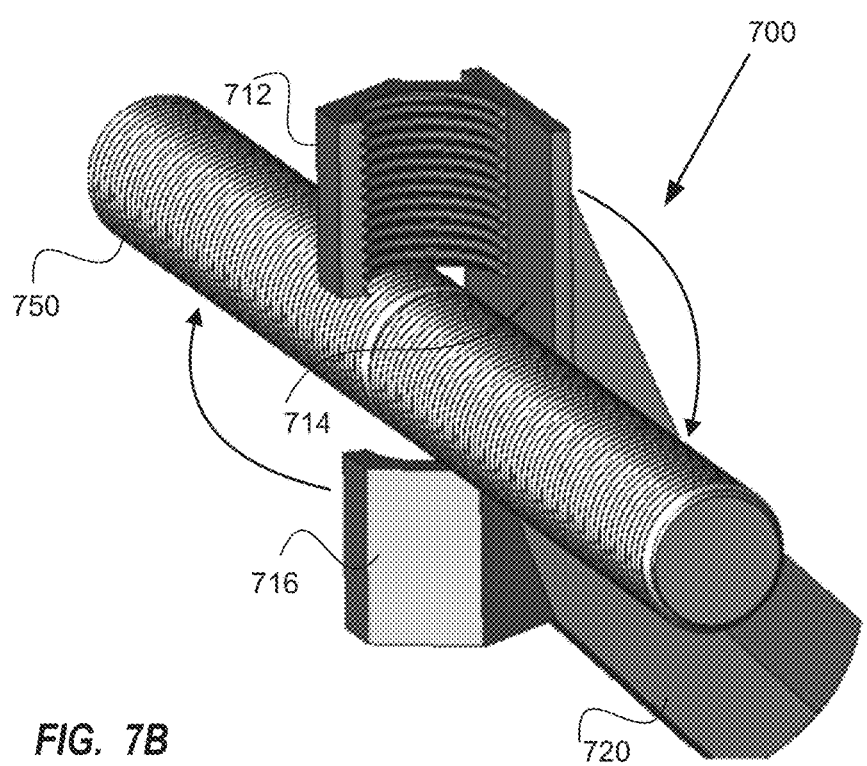
Figure 7C:
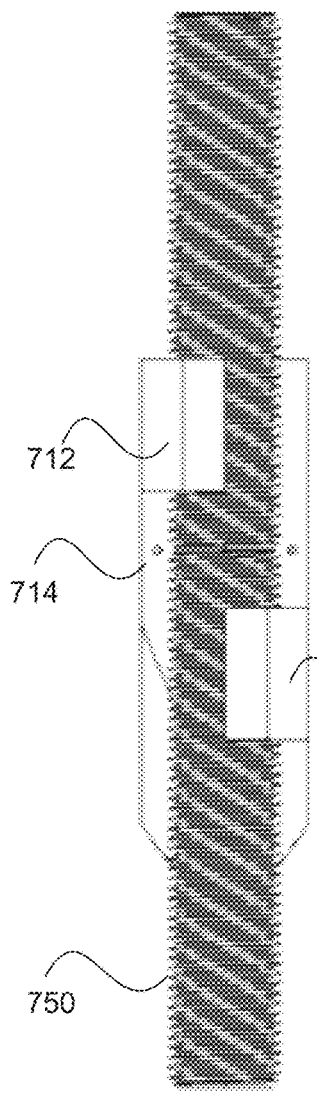
Figure 7D:
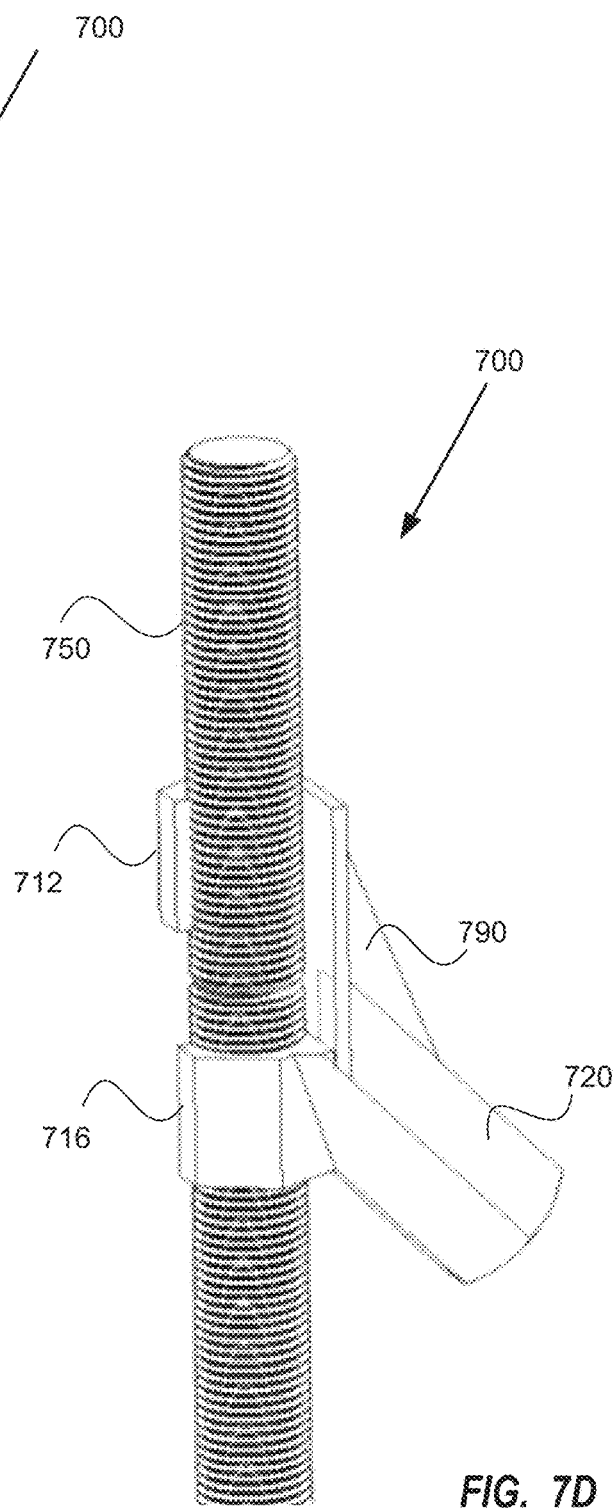

As illustrated in FIG. 7B, the coupling 700 can be placed on a threaded rod 750 such that the threaded rod 750 is located adjacent to, and perpendicular to, the middle portion 714. The coupling 700 can then be rotated in a direction (clockwise as illustrated) to engage the threads in the coupling 700 with the threaded rod 750. FIGS. 7C-D illustrates various views after the twist-on angled coupling 700 is rotated onto the threaded rod 750.

Figure 7E:
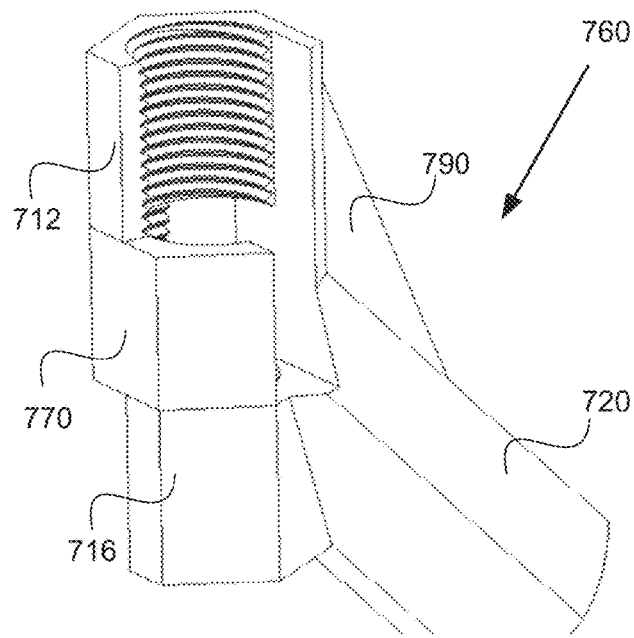
FIGS. 7E-G illustrate several views of an example twist-on angled coupling, according to one embodiment.
Figure 7F:
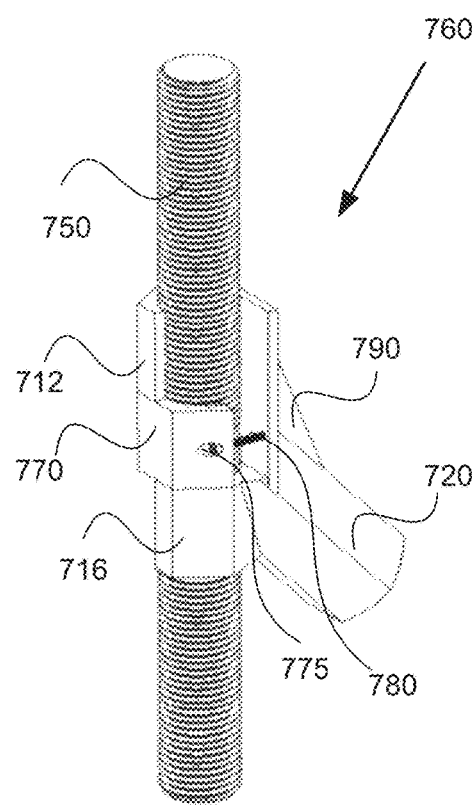
Figure 7G:
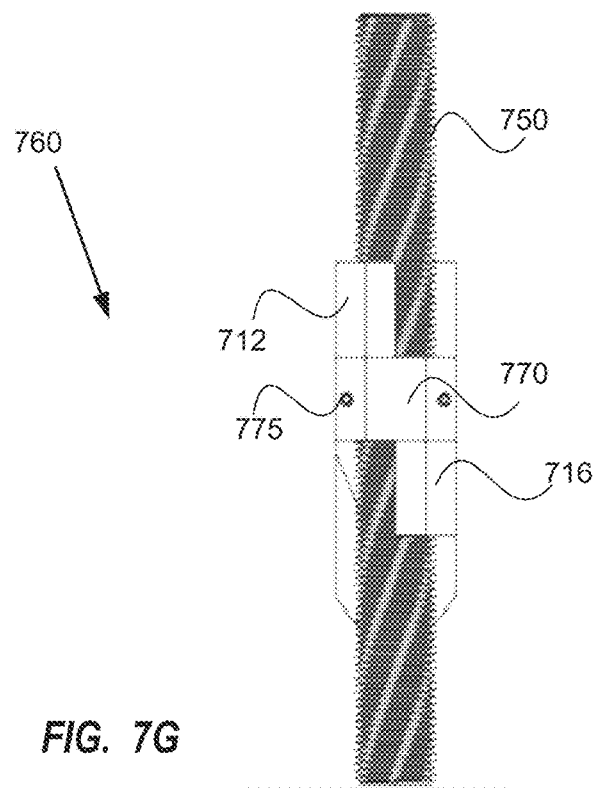

FIGS. 7E-G illustrate various views of an embodiment of a twist-on angled coupling 760 that includes a support plate 770 that may be secured in place after the coupling 760 is twisted onto the threaded rod 750. As illustrated, the support plate 770 is shaped and sized so as to be received in the middle portion 714. The support plate 770 and the middle portion 714 may include aligned holes (only holes 775 in support plate are identified) for securing them together via, for example, screws 780. The holes 775 in the support plate 770 may be recessed so as to receive heads of the screws 780 therein. The holes (not labeled) in the middle portion 714 may be threaded in order to hold the screws 780 therein and to secure the support plate 770 and the middle portion 714 together.

The support plate 770 is illustrated as simply being located and aligned with the middle portion but is not limited thereto. Rather, the support plate can fill in any portion of the opening in the twist-on coupling without departing from the current scope.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" or "in an embodiment" appearing in various places throughout the specification are not necessarily all referring to the same embodiment.

What is claimed:

1. An angled coupling for securing a threaded rod comprising: a main internally threaded passthrough coupler configured to be secured to any location on a first threaded rod without requiring the main coupler to be screwed onto the first threaded rod; and a second internally threaded coupler connected to the main coupler and extending from the main coupler at a defined angle, wherein the second coupler is to receive a second threaded rod;

wherein the main coupler includes an upper section having a first approximately half of a body thereof and corresponding threads; a middle section having a portion of the body that is aligned with the second coupler; and a lower section having a second approximately half of the body and corresponding threads, wherein the second half is opposite the first half.

2. The angled coupling of claim 1, wherein the defined angle is 45-degrees.

3. The angled coupling of claim 1, wherein the middle section is configured to be placed adjacent the first threaded rod at a desired location so that the main coupler is substantially perpendicular to the first threaded, the angled coupling is then configured to be rotated so that the upper section and the lower section engage the first threaded rod.

4. The angled coupling of claim 3, further comprising a support plate configured to be secured to the main coupler after it engages the first threaded rod.

5. The angled coupling of claim 1, wherein one of more of the angled couplings is used to provide seismic restraint.

6. The angled coupling of claim 1, wherein the angled coupling is used to provide storm-pipe surge restraint.

7. The angled coupling of claim 1, wherein a pair of the angled couplings is used to shift a threaded rod a certain distance.

8. The angled coupling of claim 1, wherein one or more of the angled couplings is used to provide an additional mounting point for a support member.

9. An angled coupling comprising
a main internally threaded passthrough coupler to have a first threaded rod pass therethrough, the main coupler including
an upper section having a first approximately half of a body thereof and corresponding threads;
a middle section having a portion of the body and no threads; and
a lower section having a second approximately half of the body and corresponding threads, wherein the second half is opposite the first half; and
a second internally threaded coupler connected to the middle section of the main coupler and extending from the main coupler at a defined angle, wherein the second coupler is to receive a second threaded rod.

* * * * *